S. G. CARKHUFF.
VEHICLE TIRE.
APPLICATION FILED SEPT. 4, 1908.
1,093,310.
Patented Apr. 14, 1914.
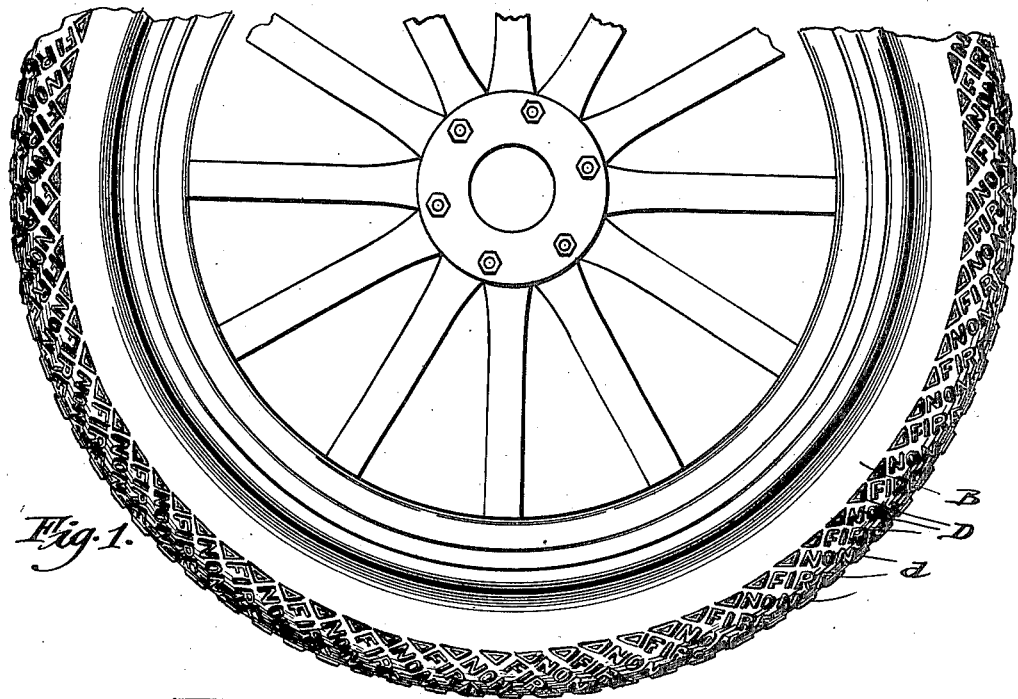
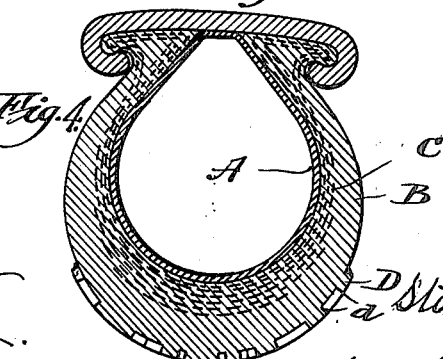

UNITED STATES PATENT OFFICE.

STACY G. CARKHUFF, OF AKRON, OHIO.

VEHICLE-TIRE.

1,093,310.

Specification of Letters Patent.   Patented Apr. 14, 1914.

Application filed September 4, 1908.   Serial No. 451,698.

*To all whom it may concern:*

Be it known that I, STACY G. CARKHUFF, a citizen of the United States, residing at Akron, county of Summit, and State of Ohio, have invented certain new and useful Improvements in Vehicle-Tires, of which the following is a specification.

This invention relates to vehicle tires, and more particularly to the sheath or outer covering for automobile tires, and has for its principal object to prevent slipping or skidding of the wheels, which frequently results in serious accidents. This skidding action is usually caused by a sudden stopping of the vehicle by the application of the brakes, or the abrupt turning of corners and it sometimes occurs when the machine is being driven straight ahead because of a slippery surface which causes the front wheels to swerve. When once this action begins it is usually impossible to control the machine by means of the steering mechanism and the skidding continues until the power can be cut off and the momentum is lost.

Various means have been proposed for increasing the adhesion of vehicle tires to prevent slipping, the most commonly used being that wherein the tread surface of the tire is provided with closely set teeth of frusto conical form arranged in staggered relation to each other and presenting curved outlines on their exterior surfaces.

My improved tire is provided with a series of projections integral with the tire sheath and forming the tread surface thereof, said projections having their engaging surfaces extended in lines or rows, preferably obliquely the circumference of the tire.

My improvement is shown in the accompanying drawings, in which—

Figure 1 is a broken side elevation of an automobile wheel equipped with a tire containing my improvements. Fig. 2 is a fragmentary plan view of the tread surface of the tire, having the projections arranged in rows obliquely across the tread surface. Fig. 3 is a transverse section of the tire sheath. Fig. 4 is a transverse section through the complete tire and its metal rim.

In the drawings A. represents the inner or inflatable air tube, and B. the tire sheath, which is of any approved construction and is composed substantially of a body of rubber or gutta percha, having the usual fabric layers, C., embodied therein. On the outer or tread surface of the tire, B., are integral projections, D., which may be of any form, but preferably having abrupt edges, *d*, such edges being arranged in rows, preferably obliquely of the tire, as shown in Fig. 2, in which the projections are in the form of letters, although the precise form of these projections is immaterial, except that the use of block-like letters gives greatly improved results, such as will be hereinafter pointed out. As shown in Fig. 2, these projections are arranged in rows which extend diagonally or obliquely across the body or tread surface of the tire, thus presenting at any given moment a tread surface composed of a series of ridges the edges of which present points of resistance arranged in lines and extending across the tread portion of the tire. By this arrangement, any tendency of the tire to skid will be resisted by a series of these rows of projections, the number of which will be dependent upon the area of the tread surface in contact with the ground, which in turn will be dependent upon the load imposed upon the tire and the degree of inflation. Thus, in the illustration shown in Fig. 2, assuming that the projections of each row are three-quarters of an inch in their longest dimension, and that eighteen inches of the surface of the tire is in contact with the ground, there would be presented twenty-four (24) rows of these projections, each presenting a number of sharp edges to the surface of the ground and tending to prevent the skidding of the tire. Similarly, in the construction shown in Fig. 2, where there are eight rows of projections, four of which present their sharp edges in each direction, there would be presented with this construction over the entire surface of the tire in contact with the ground, the resistance of four rows of these sharp-edged projections, each exerting the maximum tendency against the skidding action.

The particular configuration of the projections is not material to my invention, but I consider that the arrangement of these projections so that their engaging edges are in line is of great practical importance.

I prefer the oblique arrangement of the rows of projections because since the wheel has a forward as well as a lateral movement during the skidding action, it will be found that this oblique arrangement presents the most effective resistance to the sliding movement.

An important feature of the present invention is in the fact that when letters are used to constitute the diagonally arranged projections these letters may spell the name of the manufacturer of the tire, the name of the automobile or other vehicle on which it is used, or a trade-mark or other identifying word, name or description. While many of the advantages of using letters as indicated will naturally occur to those skilled in the art, it may be pointed out that the diagonal arrangement of these letters produces a more striking effect upon the eye than any other arrangement heretofore suggested, and also leaves an impression of the letters upon the earth, which is similarly striking and which is found to attract highly favorable attention. It is further to be noted that these diagonally arranged letters may easily be read at a glance by persons on the sidewalk passing an automobile or other vehicle equipped with these novel tires,—a feature of importance which will be at once appreciated.

Another important departure may be mentioned in that many letters of the alphabet have closed outlines, such as the O, D and Q, and others have in part closed outlines, such as the R and P. These closed and in part closed letters having a hollow interior act as suction cups, especially upon such paving as asphalt or on ice-coated surfaces where the tendency of the vehicle to skid is the greatest, and such letters co-act to hold the tire and prevent skidding. As the wheel rotates and these closed letters gradually come out of contact with the pavement air is admitted to the interior portions thereof and the holding effect of these suction cups is naturally overcome and without any retarding effect upon the wheel. In practice it is preferable to use a number of these suction cup letters at intervals on the tread of the tire.

I claim:

A vehicle tire of the character described having on its peripheral surface throughout its circumference projections of differing outlines arranged in rows disposed obliquely across the tread face of the tire, the projections having solid portions constituting ribs extending angularly with respect to a circumferential line and also angularly with respect to a transverse line and angularly also with respect to other ribs, such projections providing a variety of wedge elements at different angles adapted to co-act to grip the road surface and prevent side and drive slipping, substantially as described.

STACY G. CARKHUFF.

Witnesses:
F. R. TALBOTT,
C. H. CARLISLE.